Dec. 9, 1930.    J. S. NEWELL    1,784,024
MACHINE FOR WELDING
Filed June 24, 1922    2 Sheets-Sheet 1
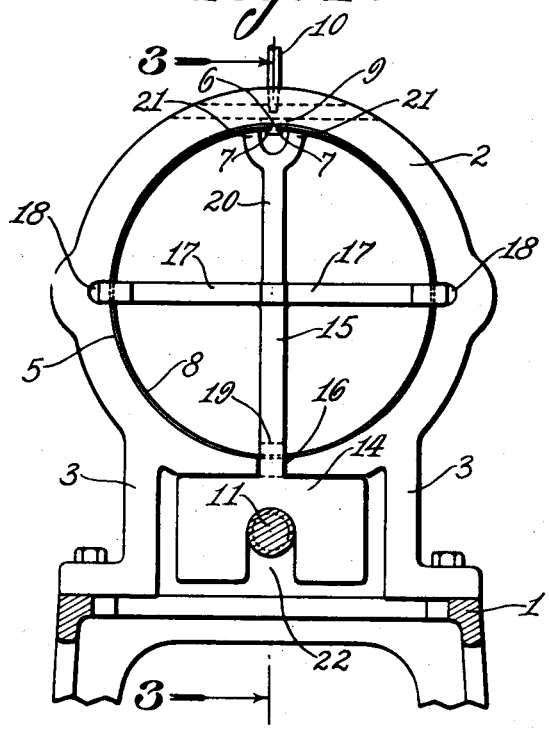
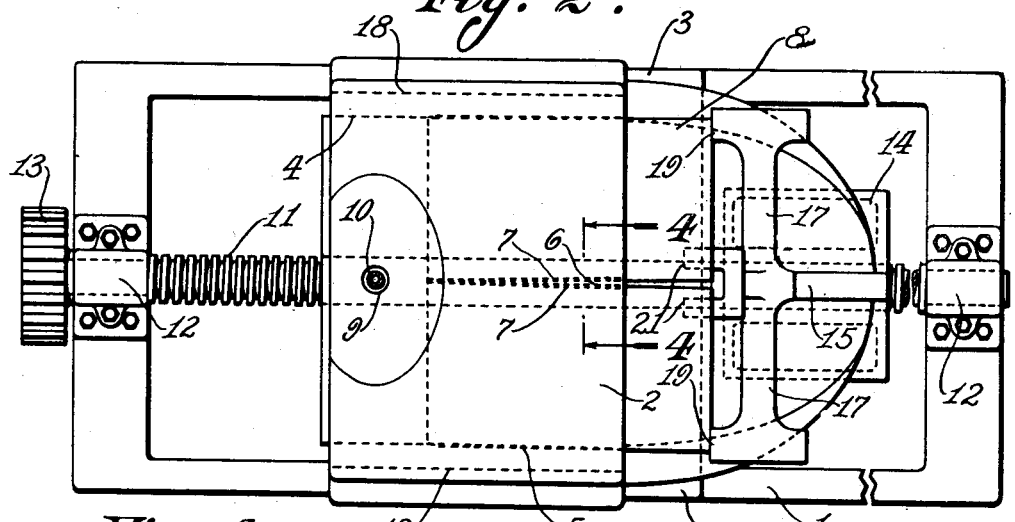
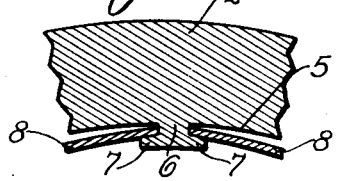
Inventor:
JAMES S. NEWELL,
By John H. Bruninga,
His Attorney.

Dec. 9, 1930. J. S. NEWELL 1,784,024
MACHINE FOR WELDING
Filed June 24, 1922 2 Sheets-Sheet 2
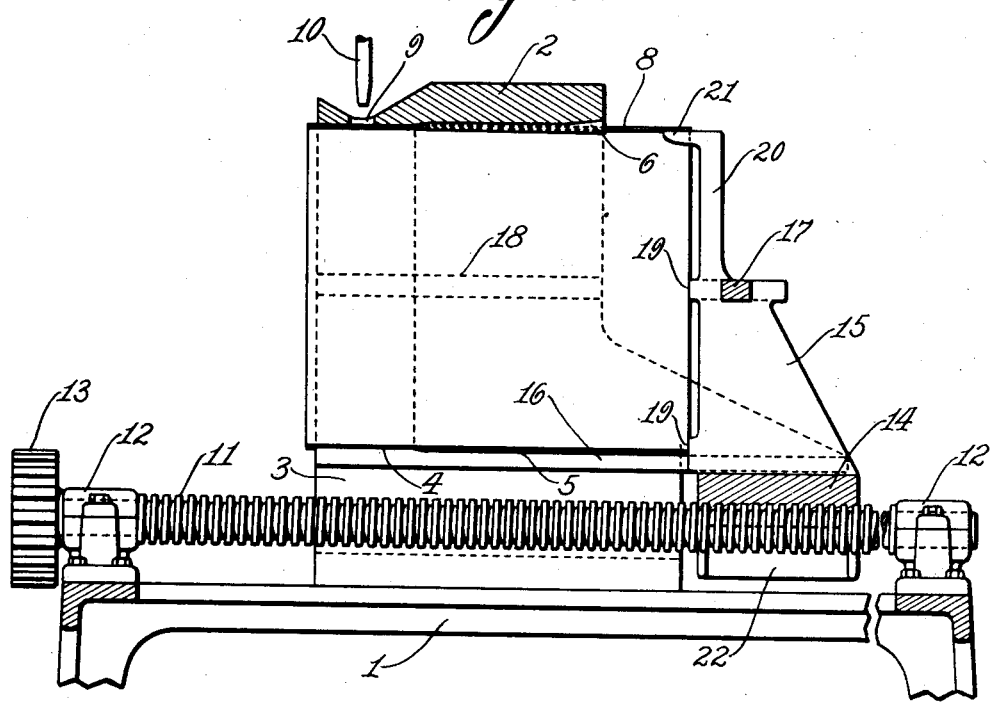
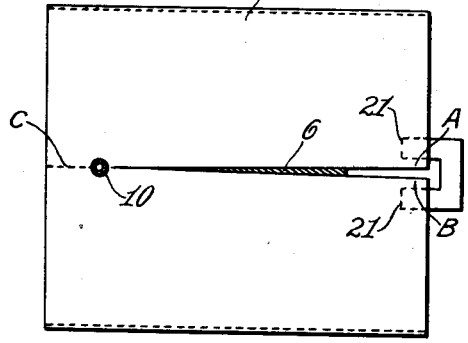
Inventor:
JAMES S. NEWELL,
By John H. Bruninga,
His Attorney.

Patented Dec. 9, 1930

1,784,024

UNITED STATES PATENT OFFICE

JAMES S. NEWELL, OF ST. LOUIS, MISSOURI, ASSIGNOR TO NATIONAL LEAD COMPANY, OF ST. LOUIS, MISSOURI, A CORPORATION OF NEW JERSEY

MACHINE FOR WELDING

Application filed June 24, 1922. Serial No. 570,680.

This invention relates to a process and apparatus for welding sheets.

In the art of welding sheets, and especially in the welding of sheets bent into cylindrical form as for the manufacture of cans and the like, trouble is often experienced through the buckling of the sheets at the welded edges. This is due to the unequal expansion and contraction of the sheet while being heated during the welding process since the entire edge cannot be welded at one time and the pressure on the edges to be welded together cannot be maintained uniform as the welding tool progresses along the weld. This results in uneven and distorted cans which are unsightly and weak in places along the weld.

One of the objects of this invention, therefore, is to provide a process and apparatus for welding sheets wherein the resulting weld will be straight and the sheets smooth and undistorted along the weld.

Another object of this invention is to provide such a method and apparatus wherein pressure may be applied between the edges to be welded together as the welding tool progresses along those edges.

Another object of this invention is to provide such a method and apparatus wherein the edges to be welded may be kept separated at those points approaching the welding tool prior to the welding operation.

Further objects will appear from the detail description taken in connection with the accompanying drawing, in which:

Figure 1 is an end view of a machine embodying this invention taken from the right hand end of Figure 2, parts being shown in section;

Figure 2 is a plan view;

Figure 3 is a longitudinal sectional view;

Figure 4 is an enlarged detail section taken on line 4—4, Figure 2; and

Figure 5 is a detail showing a partly welded can and the position of the spreader.

Referring to the accompanying drawing, the machine comprises a base 1 upon which is mounted a cylindrical frame 2 supported by upright legs 3 bolted to the frame 1. The frame 2 is provided with a cylindrical opening or throat 4 adjacent one end thereof. Adjacent the rearward end thereof, this throat becomes enlarged to form a slightly flared passage 5 through which the sheet, bent to cylindrical form, may be passed. The passage 5 tapers to meet the throat 4 so that a sheet so bent and passed through the passage 5 may be reduced in diameter so as properly to enter the throat 4. In the upper part of the passage 5 and depending from the upper wall thereof is a wedge-shaped spreader 6 having enlarged flanges 7 along the edges thereof and adapted to retain the edges of the sheet 8 as illustrated in Figure 4. At the forward end of the frame 2 and near the middle of the throat 4 is a perforation 9, through which the welding tool 10, in this case illustrated as an oxyacetylene torch, may be operated. The spreader 6 has its widest portion toward the rear of the frame 2 and tapers toward the front, terminating a short distance from the perforation 9. The frame 2 is mounted near the middle, in a lengthwise direction, of the frame 1 and the legs 3 provide therebetween and beneath the passage 5, a space through which a horizontal feed screw 11 extends. This screw may be provided with bearings 12 on the frame 1 and with a pulley or gear 13 by means of which it may be driven from any suitable source of power, not shown. Mounted upon the screw 11 and engaging the threads thereof so as to be driven thereby is a cross head 14 carrying a standard 15, the lower part of which is adapted to pass through and be guided by a slot 16 in the lower wall of the cylindrical portion of the frame 2. The standard 15 carries a pair of cross arms 17 spanning the middle of the passage 5 and engaging at their ends guide slots 18 in the frame 2. This cross head is thus adapted to be driven or fed forward by the rotation of the screw 11 so that the standard 15 and its arms 17 will move through the passage 5 and the throat 4, the cross head 14 passing through the space between the legs 3 and beneath the passage 5 during such movement. The standard 15 and the cross arms 17 are provided with abutments 19 adapted to engage the rear edge of the sheet 8 so as to feed the same through the throat during the forward movement of the cross head 14. The standard 15 further carries an upright 20 provided at its upper extremity with a pair of forwardly extending fingers 21 upon which the distended edges of the sheet 8 are adapted to rest for the purpose which will hereinafter be more fully set forth.

The lower part of the cross head 14 where it engages the screw 11 is provided with an opening 22 through which the screw 11 may be disengaged therefrom. This is provided so that the cross head may be lifted from its position and disengaged from the screw.

The operation is as follows: The torch 10 having been lighted and adjusted for operation, the sheet 8 of which the can is to be formed is bent into a rough cylindrical form and inserted into the passage 5 with its edges engaging the spreader 6 as illustrated in Figure 4. The cross head 14 is then placed upon the screw 11 in rear of the sheet, after which rotation of the screw 11 may be started. As the cross head 14 feeds forward by the motion of the screw 11, the operator arranges the edges of the sheet so that they will properly engage the abutments 19 and the fingers 21. The sheet is then fed forward by the abutments 19 into the throat 4. The spreader 6 also acts as a guide to guide the edges to be welded under the torch 10. As the sheet is forced into the throat 4, these edges will be forced together with considerable pressure, so that when the flame of the torch 10 impinges thereupon and the material is heated to welding heat thereby, sufficient pressure will be applied to properly force the softened edges together so as to produce a true weld. The sheet is fed forward uniformly and the rate of movement is adjusted, so that the heating is just sufficient to form a proper weld. The sheet is then fed entirely through the passage 5 and the throat 4, the edges being welded together during such passage and is then forced out of the throat 4 as the cross head 14 moves onward. As soon as the sheet has been ejected from the throat and the cross head has moved clear of the slots 16 and 18, the rotation of the screw 11 may be stopped. A new sheet is now inserted into the passage 5, the cross head is removed from the front end of the screw 11 and adjusted upon the rear end thereof so that upon resuming rotation of the screw 11, the operation may be repeated. It will be seen that this operation can be carried on by a skillful operator without arresting the rotation of the screw 11. As soon as the cross head moves into the throat 4, a new sheet may be inserted in the passage 5 and fed forward by hand as fast as the movement of the cross head will allow. In the meantime, the preceding can sheet will have been ejected. Now, as the cross head 14 emerges from the frame 2, it may be lifted off the screw 11 by the operator and transferred to the rear end of the machine ready for a new operation on the sheet already inserted.

Figure 5 illustrates a sheet undergoing the process of welding and which has been partly welded. The rearward edges of the sheet A and B are kept separated by the action of the spreader 6. This spreader being tapered permits the edges to be forced together when the sheet enters the throat 4 as already described. The torch 10 acting upon the abutting edges forms a weld under pressure as previously set forth. The portion C of the sheet has, therefore, been welded and the metal of the weld set. Just under the torch 10, the metal is hot and in the plastic condition necessary for welding. At this point, the edges are being pressed together by the crowding action of the throat 4 as the sheet enters thereinto. The throat thus supports and forms the sheet during the welding process and is active in applying pressure to the edges at the weld. It will be noted that as the point of application of the tool progresses along the edges, these edges are kept separated while approaching said point of application and are brought together at the point of application by swinging them about the part C of the sheet already welded. Thus a sort of lever action is obtained in pressing the edges together at the point being welded. It will further be noted that as the sheet approaches the point of application of the tool, the edges are brought gradually nearer together so that the diameter of the formed sheet will become progressively less until the point of application is reached, after which the throat 4, being of uniform cross section, the diameter is maintained uniform. The result of such an action is that the diameter of the finished can will be uniform and all buckling or distortion of the sheet along the welded edge is prevented. The sheet will be ironed out, as it were, along the welded edge by the action of the throat 4, so that a perfectly smooth and true cylinder will result.

As the flow of heat from the point of application of the torch into and through the metal of the sheet, due to the tendency of the metal to cool immediately takes place in all directions during the progress of the weld, it will be necessary for the torch to supply heat at a definite rate, in order to raise the temperature of the metal to the required point. It will be evident that, as the point of application approaches the rearward edge of the sheet 8, the flow of heat will be more and more restricted since it can take place in only one direction from that edge. The result of this would ordinarily be that the metal would become too hot, due to insufficient cooling action at the end of the weld, and a notch or blow hole would be produced at the end of the weld by the torch blowing out the metal at that point. For this reason, the fingers 21 have been provided to bear against the edges A and B at the rearward end of the sheet, so as to regulate the cooling of the sheet by carrying off heat at the same rate at the end of the weld as takes place at other points of the weld. By this means, the formation of a notch or blow hole is effectively prevented.

It will, therefore, be seen that the invention accomplishes its objects. A process is provided wherein the sheet to be formed may have its edges joined and welded in such a way that all buckling and distortion are avoided. The weld is formed under pressure so that a true weld will be formed. The ironing action of the throat provides for smoothing out the formed and welded sheet so that a uniform product is obtained. This is accomplished by keeping the edges A and B separated as they approach the melting point and then bringing them together by swinging them about the welded portion, so as to force the edges together at the point of application of the torch. Thus a true weld and a smooth finish may be obtained.

It is obvious that various changes may be made in details of construction without departing from the spirit of this invention; it is, therefore, to be understood that this invention is not to be limited to the specific details shown and described.

Having thus described the invention, what is claimed is:—

1. In the art of butt-welding sheets, the process comprising, transferring the point of operation of the tool along the edges, maintaining the approaching edges separated, and conducting the heat away from the sheet edges at the end of the sheet.

2. A machine for butt-welding sheets comprising, a welding tool, a support having a contracting throat to receive the sheet, means for passing an annular sheet therethrough to be contracted annularly thereby, and a spreader adapted to engage the edges of the sheet approaching the contracted portion of said throat at the tool.

3. A machine for butt-welding sheets comprising, a welding tool, a support having an expanding throat to receive the sheet, said throat expanding rearwardly of said tool, means for passing the sheet therethrough, and a spreader adapted to engage the edges of the sheet approaching the tool.

4. A machine for butt-welding sheets comprising, a welding tool, a support having an expanding throat to receive the sheet, said throat having a uniform passage forwardly of said tool and expanding rearwardly of said tool, means for passing the sheet therethrough, and a wedge on said support engaging the edges of the sheet and diverging rearwardly of said tool.

5. A machine for butt-welding sheets, comprising, a welding tool, a sheet support, means for passing the sheet along said support in order to transfer the point of operation of the tool along the sheet edges, and means for conducting heat away from the sheet edges at the end of the sheet.

6. A machine for butt-welding sheets, comprising, a welding tool, a sheet support, means for passing the sheet along said support in order to transfer the point of operation of the tool along the sheet edges, and a heat-conducting finger making thermal contact with the end of the sheet.

In testimony whereof I affix my signature this 22nd day of May, 1922.

JAMES S. NEWELL.